(12) United States Patent
Kim et al.

(10) Patent No.: US 8,811,255 B2
(45) Date of Patent: Aug. 19, 2014

(54) METHOD FOR ALLOCATING RESOURCE FOR MULTICAST AND/OR BROADCAST SERVICE DATA IN WIRELESS COMMUNICATION SYSTEM AND AN APPARATUS THEREFOR

(75) Inventors: Dong Cheol Kim, Gyeonggi-do (KR); Jinsoo Choi, Gyeonggi-do (KR); Han Gyu Cho, Gyeonggi-do (KR); Jin Sam Kwak, Gyeonggi-do (KR); Wook Bong Lee, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 328 days.

(21) Appl. No.: 13/058,447

(22) PCT Filed: Jan. 14, 2010

(86) PCT No.: PCT/KR2010/000235
§ 371 (c)(1),
(2), (4) Date: Feb. 10, 2011

(87) PCT Pub. No.: WO2010/085060
PCT Pub. Date: Jul. 29, 2010

(65) Prior Publication Data
US 2011/0134825 A1    Jun. 9, 2011

Related U.S. Application Data

(60) Provisional application No. 61/145,979, filed on Jan. 21, 2009, provisional application No. 61/159,799, (Continued)

(30) Foreign Application Priority Data

Jan. 5, 2010    (KR) ........................ 10-2010-0000386

(51) Int. Cl.
*H04W 72/04*    (2009.01)
*H04L 5/00*    (2006.01)
*H04W 48/12*    (2009.01)

(52) U.S. Cl.
CPC ............ *H04L 5/0007* (2013.01); *H04L 5/0044* (2013.01); *H04W 48/12* (2013.01); *H04W 72/0453* (2013.01); *H04L 5/0037* (2013.01)
USPC .......................................... 370/312; 370/432

(58) Field of Classification Search
None
See application file for complete search history.

(56) References Cited

U.S. PATENT DOCUMENTS 6,795,419 B2    9/2004 Parantainen et al.
(Continued)

FOREIGN PATENT DOCUMENTS

JP    2008-517518 A    5/2008
JP    2008-533836 A    8/2008
(Continued)

OTHER PUBLICATIONS

2nd Notification of Office Action dated Oct. 10, 2013 from the State Intellectual Property Office of China in counterpart Chinese application No. 201080002859.6.

*Primary Examiner* — Bunjob Jaroenchonwanit
(74) *Attorney, Agent, or Firm* — Morgan, Lewis & Bockius LLP

(57) ABSTRACT

The present invention relates to a wireless communication system, and more particularly, to a method for allocating a resource for multicast and/or broadcast service data in a wireless communication system and apparatus therefore. The present invention includes the steps of dividing a downlink frequency band into a plurality of frequency partitions, allocating one or more subbands in a certain frequency partition among the plurality of frequency partitions to the MBS data, and c) allocating one or more subbands in each remaining frequency partitions one by one to the MBS data, if the number of subbands required for transmitting the MBS data (KSB,E MBS) is larger than the number of subbands in the certain frequency partition.

11 Claims, 15 Drawing Sheets

Related U.S. Application Data filed on Mar. 12, 2009, provisional application No. 61/237,705, filed on Aug. 28, 2009, provisional application No. 61/240,637, filed on Sep. 8, 2009, provisional application No. 61/241,030, filed on Sep. 10, 2009, provisional application No. 61/241,410, filed on Sep. 11, 2009, provisional application No. 61/241,406, filed on Sep. 11, 2009, provisional application No. 61/260,020, filed on Nov. 11, 2009, provisional application No. 61/262,140, filed on Nov. 17, 2009.

(56) References Cited

U.S. PATENT DOCUMENTS

| | | | |
|---|---|---|---|
| 7,221,680 B2 | 5/2007 | Vijayan et al. | |
| 7,782,807 B2* | 8/2010 | Yoon et al. | 370/312 |
| 7,873,023 B2 | 1/2011 | Ihm et al. | 370/349 |
| 8,095,141 B2 | 1/2012 | Teague | 455/452.1 |
| 8,204,020 B2* | 6/2012 | Cho et al. | 370/330 |
| 8,305,999 B2* | 11/2012 | Palanki et al. | 370/335 |
| 8,310,991 B2* | 11/2012 | Kasslin et al. | 370/328 |
| 8,310,997 B2* | 11/2012 | Kim et al. | 370/329 |
| 2006/0146760 A1* | 7/2006 | Khandekar et al. | 370/335 |
| 2006/0205414 A1 | 9/2006 | Teague | 455/452.1 |
| 2006/0223449 A1* | 10/2006 | Sampath et al. | 455/69 |
| 2007/0041429 A1* | 2/2007 | Khandekar | 375/146 |
| 2007/0189162 A1* | 8/2007 | Song et al. | 370/230 |
| 2007/0293229 A1* | 12/2007 | Khan | 455/450 |
| 2008/0025241 A1* | 1/2008 | Bhushan et al. | 370/312 |
| 2008/0079574 A1* | 4/2008 | Soffer | 340/568.1 |
| 2008/0089312 A1* | 4/2008 | Malladi | 370/345 |
| 2008/0101307 A1* | 5/2008 | Sindhushayana et al. | 370/337 |
| 2008/0130611 A1* | 6/2008 | Branlund et al. | 370/342 |
| 2008/0165743 A1* | 7/2008 | Palanki et al. | 370/335 |
| 2008/0176577 A1* | 7/2008 | Bourlas et al. | 455/454 |
| 2008/0212520 A1* | 9/2008 | Chen et al. | 370/320 |
| 2009/0061778 A1* | 3/2009 | Vrzic et al. | 455/62 |
| 2009/0109890 A1* | 4/2009 | Chow et al. | 370/312 |
| 2009/0116435 A1* | 5/2009 | Koorapaty et al. | 370/329 |
| 2009/0129334 A1* | 5/2009 | Ma et al. | 370/331 |
| 2010/0061285 A1* | 3/2010 | Maeda et al. | 370/312 |
| 2010/0103895 A1* | 4/2010 | Cho et al. | 370/329 |
| 2010/0110959 A1 | 5/2010 | Shimobayashi | 370/312 |
| 2010/0118824 A1 | 5/2010 | Ihm et al. | 370/329 |
| 2010/0173651 A1* | 7/2010 | Park et al. | 455/458 |
| 2010/0177723 A1* | 7/2010 | Kim et al. | 370/329 |
| 2010/0202340 A1* | 8/2010 | Josiam et al. | 370/312 |
| 2010/0223054 A1* | 9/2010 | Nemer et al. | 704/219 |
| 2010/0254342 A1* | 10/2010 | Cho et al. | 370/330 |
| 2011/0007683 A1* | 1/2011 | Kim et al. | 370/312 |
| 2011/0051676 A1* | 3/2011 | Josiam et al. | 370/329 |
| 2011/0117953 A1* | 5/2011 | Kim et al. | 455/522 |
| 2011/0142003 A1* | 6/2011 | Kuchi et al. | 370/330 |
| 2011/0143800 A1* | 6/2011 | Han et al. | 455/509 |
| 2011/0188441 A1* | 8/2011 | Kim et al. | 370/312 |
| 2011/0211618 A1* | 9/2011 | Oyman et al. | 375/211 |
| 2011/0216808 A1* | 9/2011 | Tong et al. | 375/135 |
| 2011/0287772 A1* | 11/2011 | Park et al. | 455/450 |
| 2012/0207081 A1* | 8/2012 | Cho et al. | 370/315 |
| 2012/0275370 A1* | 11/2012 | Cho et al. | 370/312 |
| 2012/0314638 A1* | 12/2012 | Park et al. | 370/311 |
| 2012/0320834 A1* | 12/2012 | Branlund et al. | 370/328 |
| 2013/0070623 A1* | 3/2013 | Chun et al. | 370/252 |

FOREIGN PATENT DOCUMENTS

| | | |
|---|---|---|
| KR | 10-0670417 | 5/2006 |
| KR | 10-2007-0022589 | 2/2007 |
| KR | 10-0717972 | 5/2007 |
| KR | 10-2008-0021241 | 3/2008 |
| WO | 03/077453 A2 | 9/2003 |
| WO | WO2007/024073 | 3/2007 |
| WO | WO 2008-090661 A1 | 7/2008 |

* cited by examiner

US 8,811,255 B2

METHOD FOR ALLOCATING RESOURCE FOR MULTICAST AND/OR BROADCAST SERVICE DATA IN WIRELESS COMMUNICATION SYSTEM AND AN APPARATUS THEREFOR

The present application is a national stage of PCT International Application No. PCT/KR2010/000235, filed Jan. 14, 2010, and claims the benefit of U.S. Provisional Application Nos. 61/145,979, filed Jan. 21, 2009; 61/159,799, filed Mar. 12, 2009; 61/237,705, filed Aug. 28, 2009; 61/240,637, filed Sep. 8, 2009; 61/241,030, filed Sep. 10, 2009; 61/241,410, filed Sep. 11, 2009; 61/241,406, filed Sep. 11, 2009; 61/260,020, filed Nov. 11, 2009; 61/262,140, filed Nov. 17, 2009. The present national stage application also claims the benefit of Korean Patent Application No. 10-2010-0000386, filed Jan. 5, 2010.

TECHNICAL FIELD

The present invention relates to a wireless communication system, and more particularly, to a method for allocating a resource for multicast and/or broadcast service data in a wireless communication system and apparatus therefor.

BACKGROUND ART

First of all, FIG. 1 exemplarily shows a wireless communication system. Referring to FIG. 1, a wireless communications system 100 consists of a plurality of base stations 110 and a plurality of mobile stations 120. The wireless communications system 100 can include a homogeneous network or a heterogeneous network. In this case, the heterogeneous network represents the network in which different network entities including macro cells, femto cells, relays and the like coexist. The base station is a fixed station that communicates with a mobile station in general. And, the base stations 110a, 110b and 110c provide services to specific geographical areas 102a, 102b and 102c, respectively. In order to enhance system performance, each of the specific geographical areas can be further divided into a plurality of smaller regions 104a, 104b and 104c for example. Each of the smaller areas can be named a cell, a sector or a segment. In IEEE 802.16e system, a cell identity (cell_ID or IDCell) is given with reference to a whole system. On the contrary, a sector or segment identity is given with reference to a specific area in which each base station provides a service and has a value set to one of 0 to 2. The mobile station 120 is distributed in the wireless communication system in general and is fixed or movable. Each of the mobile stations is able to communicate with at least one base station at a random moment in uplink ((UL) or downlink (DL). A base station and a mobile station are able to communicate with each other using one of CDMA (code division multiple access) system, FDMA (frequency division multiple access) system, TDMA (time division multiple access) system, SC-FDMA (single carrier frequency division multiple access) system, MC-FDMA (multi carrier frequency division multiple access) system, OFDMA (orthogonal frequency division multiple access) system, a combination thereof and the like. In this disclosure, 'uplink' indicates a communication link from a mobile station to a base station. And, 'downlink' indicates a communication link from a base station to a mobile station.

DISCLOSURE OF INVENTION

Technical Problem

An object of the present invention is to provide a method for allocating resource for multicast and/or broadcast service data in wireless communication system and a apparatus therefore.

It is to be understood that technical problems to be solved by the present invention are not limited to the aforementioned technical problems and other technical problems which are not mentioned will be apparent from the following description to the person with an ordinary skill in the art to which the present invention pertains.

Solution to Problem

Accordingly, the present invention is directed to a method for allocating a resource for multicast and/or broadcast service data in a wireless communication system and apparatus therefor that substantially obviate one or more of the problems due to limitations and disadvantages of the related art.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, a method for allocating resource for multicast and/or broadcast service (MBS) data at a base station in a wireless communication system, includes steps of a) dividing a downlink frequency band into a plurality of frequency partitions, b) allocating one or more subbands in a certain frequency partition among the plurality of frequency partitions to the MBS data, and c) allocating one or more subbands in remaining frequency partitions one by one to the MBS data, if the number of subbands required for transmitting the MBS data ($K_{SB,E\text{-}MBS}$) is larger than the number of subbands in the certain frequency partition. Preferably, the certain frequency partition has a lowest index.

More preferably, the step of b) comprises allocating the one or more subbands to the MBS data in order of increasing indexes from a subband having a lowest index in the certain frequency partition. And, the step of c) comprises allocating the one or more subbands from each subband having a lowest index in the remaining frequency partitions one by one, in order of increasing indexes of the remaining frequency partitions.

Moreover, the $K_{SB,E\text{-}MBS}$ is transmitted to a mobile station through an E-MBS_SUBBAND_INDICATOR field included in an AAI-E-MBS_CFG message. And, the method is characterized in further including the step of performing subcarrier permutation to the allocated subbands for the MBS data in each frequency partition.

To further achieve these and other advantages and in accordance with the purpose of the present invention, a base station includes a processor for dividing a downlink frequency band into a plurality of frequency partitions and for allocating one or more subbands in a certain frequency partition among the plurality of frequency partitions to multicast and/or broadcast service (MBS) data, and a transmitting module for transmitting the MBS data through the allocated subbands, wherein the processor allocates one or more subbands in remaining frequency partitions one by one to the MBS data, if the number of subbands required for transmitting the MBS data ($K_{SB,E\text{-}MBS}$) is larger than the number of subbands in the certain frequency partition.

To further achieve these and other advantages and in accordance with the purpose of the present invention, a method for receiving multicast and/or broadcast service (MBS) data at a mobile station in a wireless communication system includes steps of receiving information on the number of subbands required for the MBS data ($K_{SB,E-MBS}$), and receiving the MBS data using the received information, wherein the MBS data is read from one or more subbands in a certain frequency partition among a plurality of frequency partitions, and wherein the MBS data is also read from one or more subbands in remaining frequency partitions one by one, if the $K_{SB,E-MBS}$ is larger than the number of subbands in the certain frequency partition. Preferably, the certain frequency partition has a lowest index.

More preferably, the MBS data is read from a subband having a lowest index in the certain frequency partition. And, the MBS data is also read from each subband having a lowest index in the remaining frequency partitions one by one, in order of increasing indexes of the remaining frequency partitions.

To further achieve these and other advantages and in accordance with the purpose of the present invention, a mobile station includes a receiving module for receiving multicast and/or broadcast service (MBS) data through a plurality of frequency partitions from a base station and for receiving the number of subbands required for the MBS data ($K_{SB,E-MBS}$) and a processor for reading the MBS data from one or more subbands of a certain frequency partition among the plurality of frequency partitions, wherein the processor reads the MBS data from one or more subbands in remaining frequency partitions one by one, if the $K_{SB,E-MBS}$ is larger than the number of subbands in the certain frequency partition.

It is to be understood that both the foregoing general description and the following detailed description are exemplary and explanatory and are intended to provide further explanation of the invention as claimed.

Advantageous Effects of Invention

Accordingly, the present invention provides the following effects or advantages.

First of all, the present invention is able to efficiently allocate a resource for multicast and/or broadcast service data in a wireless communication system.

BRIEF DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

In the drawings.

MODE FOR THE INVENTION

Reference will now be made in detail to the preferred embodiments of the present invention, examples of which are illustrated in the accompanying drawings. First of all, embodiments of the present invention in the following description are examples for applying the technical features of the present invention are applied to a system that uses a plurality of orthogonal subcarriers. For clarity and convenience of the following description, the present invention is described using IEEE 802.16 system for example. And, the present invention is applicable to various wireless communication system including 3GPP (3rd Generation Partnership Project) system.

Figure 1:
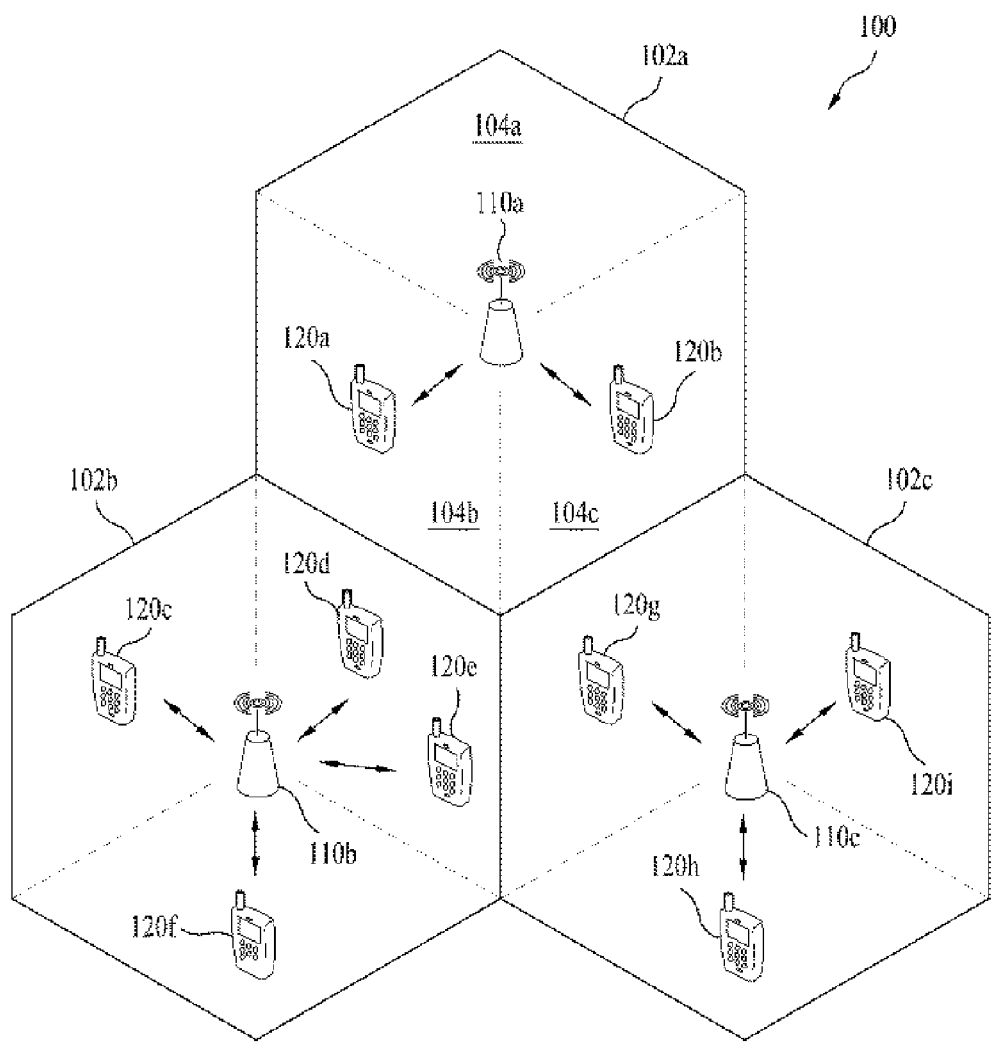
FIG. 1 is a diagram for an example of a wireless communication system.
Figure 2:
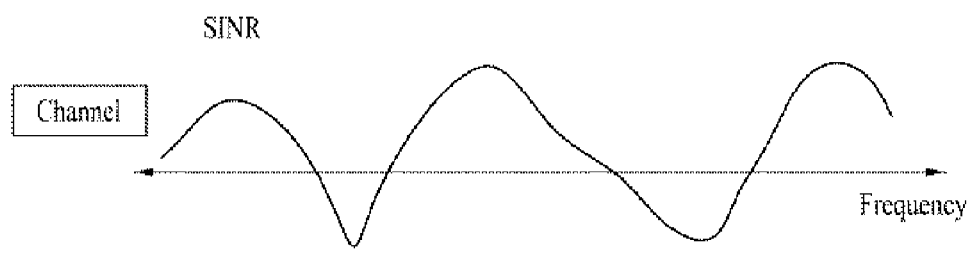
FIG. 2 is a diagram for an example of channel variation in a wireless communication system.
Figure 3:
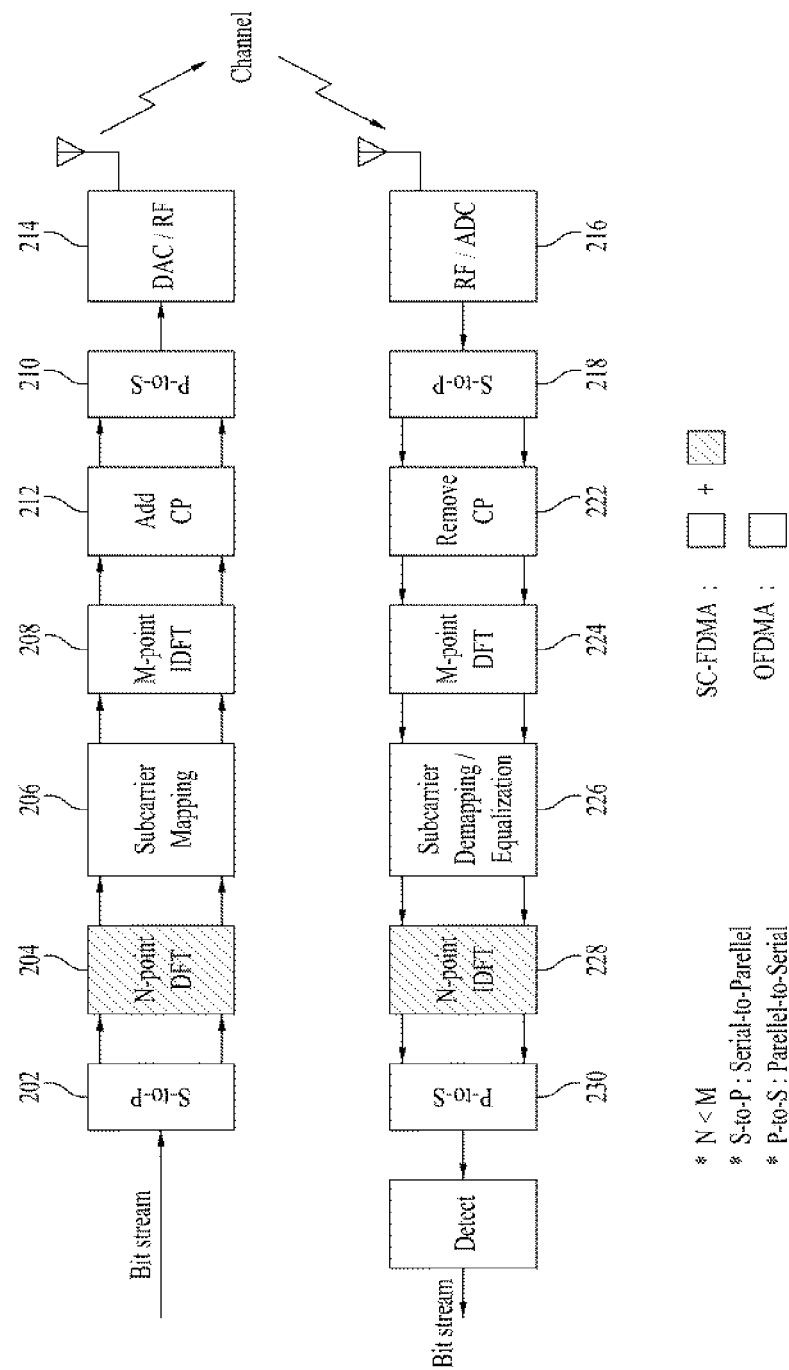
FIG. 3 is a block diagram for an example of a transmitter and receiver for OFDMA and SC-FDMA.

FIG. 3 is a block diagram for an example of a transmitter and receiver for OFDMA and SC-FDMA. In uplink, a transmitter may include a part of a mobile station and a receiver may include a part of a base station. In downlink, a transmitter may include a part of a base station and a receiver may include a part of a mobile station.

Referring to FIG. 3, an OFDMA transmitter includes a Serial to Parallel converter 202, a subcarrier mapping module 206, an M-point IDFT (Inverse Discrete Fourier Transform) module 208, a Cyclic prefix (CP) adding module 210, a Parallel to Serial converter 212 and an RF/DAC (Radio Frequency/Digital to Analog) converter module 214.

A signal processing process in an OFDMA transmitter is described as follows. First of all, a bitstream is modulated into a data symbol sequence. Particularly, it is able to obtain the bitstream by performing various signal processings including channel encoding, interleaving, scrambling and the like on a data block delivered from a MAC (medium access control) layer. A bitstream is often called a codeword and is equivalent to a data block received from a MAC layer. And, the data block received from the MAC layer can be called a transport block as well. Modulation scheme is non-limited by the above description and can include one of BPSK (Binary Phase Shift Keying), QPSK (Quadrature Phase Shift Keying), n-QAM (n-Quadrature Amplitude Modulation) and the like. Subsequently, a serial data symbol sequence is converted to N data symbols in parallel [202]. The N data symbols are mapped by N subcarriers allocated among total M subcarriers and the (M−N) remaining subcarriers are padded with 0[206]. The data symbol mapped in a frequency domain is transformed into a time-domain sequence through M-point IDFT processing [208]. Afterwards, in order to reduce inter-symbol interference (ISI) and inter-carrier interference (ICI), OFDMA symbol is generated by adding a cyclic prefix to the time-domain sequence [212]. The OFDMA symbol is then transmitted to a receiver through digital-to-analog conversion, frequency uplink transform and the like [214]. And, available subcarriers among the (M−N) remaining subcarriers are allocated to another user. And, an OFDMA receiver includes an RF/ADC (radio frequency/analog to digital converter) module 216, a serial to parallel converter 218, a CP removing (CP remove) module 220, an M-point DFT (discrete Fourier transform) module 224, a subcarrier demapping/equalization module 226, a parallel to serial converter 228 and a detection module 230. A signal processing process of the OFDMA receiver has a configuration in reverse to that of the OFDMA transmitter.

Meanwhile, compared to the OFDMA transmitter, an SC-FDMA transmitter further includes an N-point DFT module 204 behind the subcarrier mapping module 206. The SC-FDMA transmitter spreads a plurality of data in a frequency domain through DFT prior to IDFT processing, thereby considerably decreasing a PAPR (peak-to-average power ratio) into a level lower than that of OFDMA system. Compared to the OFDMA receiver, an SC-FDMA receiver further includes an N-point IDFT module 228 next to the subcarrier demapping module 226. And, a signal processing process of the SC-FDMA receiver has a configuration in reverse to that of the SC-FDMA transmitter.

The modules exemplarily shown in FIG. 3 are provided for the above description only. The transmitter and/or the receiver can further include at least one necessary module. The modules/functionality can be omitted in part or may be separable into different modules/functionality. At least two of the modules can be integrated into one module.

Figure 4:
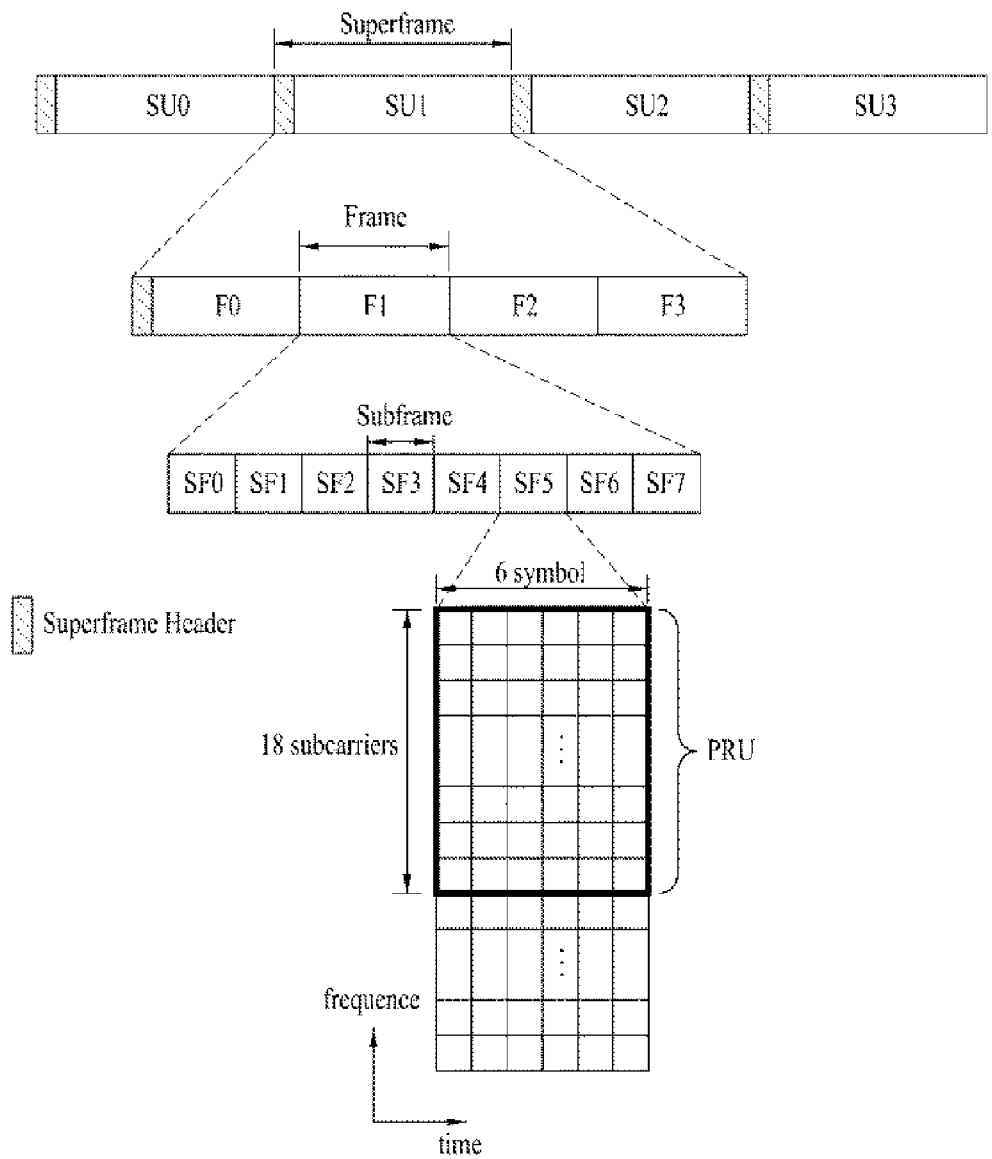
FIG. 4 is a diagram for an example of a radio frame structure in IEEE 802.16m system.

FIG. 4 is a diagram for an example of a radio frame structure in IEEE 802.16m system. A radio frame structure is applicable to FDD (Frequency Division Duplex), HFDD (Half Frequency Division Duplex), TDD (Time Division Duplex) and the like.

Referring to FIG. 4, a radio frame structure includes 20 ms-superframs SU0 to SU3 capable of supporting 5 MHz, 8.75 MHz, 10 MHz or 20 MHz. The superframe includes 4 5 ms-frames F0 to F3 equal to each other in size and starts with a superframe header (SFH). The superframe header carries an essential system parameter and system configuration information. The superframe header can be located within a first subframe. The superframe header can be classified into P-SFH (primary-SFH) and S-SFH (secondary-SFH). The P-SFH is transmitted every superframe. And, the S-SFH is transmittable each superframe. And, the superframe header can include a broadcast channel.

A frame includes 8 subframes SF0 to SF7. The subframe is allocated to downlink or uplink transmission. The subframe includes a plurality of OFDM symbols in time domain or includes a plurality of subcarriers in frequency domain. The OFDM symbol can be called OFDMA symbol, SC-FDMA symbol or the like according to a multiple access system. The number of OFDM symbols included in a subframe can be variously modified according to a channel bandwidth, a CP length and the like. It is able to define a type of a subframe according to the number of OFDM symbols included in a subframe. For instance, a type-1 subframe can be defined as including 6 OFDM symbols. A type-2 subframe can be defined as including 7 OFDM symbols. A type-3 subframe can be defined as including 5 OFDM symbols. And, a type-4 subframe can be defined as including 9 OFDM symbols. On frame includes subframes of the same type all or subframes differing from each other in type.

OFDM symbol includes a plurality of subcarriers. And, the number of the subcarriers is determined according to a size of FFT (fast Fourier transform). Types of subcarriers can be classified into a data subcarrier for data transmission, a pilot subcarrier for channel measurement, and a null subcarrier for a guard band and a DC component. Parameters for characterizing an OFDM symbol include BW, Nused, n, G, etc. The BW is a nominal channel bandwidth. The Nused is the number of subcarriers used for signal transmission. The n is a sampling factor and determines subcarrier spacing and a useful symbol time together with BW and Nused. And, the G indicates a ratio of a CP type to a useful time.

Table 1 shows examples of OFDMA parameters.

TABLE 1

| The nominal channel bandwidth, BW (MHz) | | 5 | 7 | 8.75 | 10 | 20 |
|---|---|---|---|---|---|---|
| Sampling factor. n | | 28/25 | 8/7 | 8/7 | 28/25 | 28/25 |
| Sampling frequency. $F_s$ (MHz) | | 5.6 | 8 | 10 | 11.7 | 22.4 |
| FFT size, $N_{FFT}$ | | 512 | 1024 | 1024 | 1024 | 2048 |
| Subcarrier spacing, $\Delta f$ (kHz) | | 10.94 | 7.81 | 9.77 | 10.94 | 10.94 |
| Useful symbol time, $T_b$ (μs) | | 91.4 | 128 | 102.4 | 91.4 | 91.4 |
| CP ratio, G = 1/8 | OFDMA symbol time, $T_s$ (μs) | 102.857 | 144 | 115.2 | 102.857 | 102.857 |
| | FDD Number of OFDMA symbols per 5 ms frame | 48 | 34 | 43 | 48 | 48 |
| | Idle time (μs) | 62.857 | 104 | 46.40 | 62.857 | 62.857 |
| | TDD Number of OFDMA symbols per 5 ms frame | 47 | 33 | 42 | 47 | 47 |
| | TTG + RTG (μs) | 165.714 | 248 | 161.6 | 165.714 | 165.714 |
| CP ratio, G = 1/16 | OFDMA symbol time. $T_s$ (μs) | 97.143 | 136 | 108.8 | 97.143 | 97.143 |
| | FDD Number of OFDMA symbols per 5 ms frame | 51 | 36 | 45 | 51 | 51 |
| | Idle time (μs) | 45.71 | 104 | 104 | 45.71 | 45.71 |
| | TDD Number of OFDMA symbols per 5 ms frame | 50 | 35 | 44 | 50 | 50 |
| | TTG + RTG (μs) | 142.853 | 240 | 212.8 | 142.853 | 142.853 |

TABLE 1-continued

| | | | | | | | |
|---|---|---|---|---|---|---|---|
| CP ratio, G = ¼ | OFDMA symbol time, $T_s$ (μs) | | 114.286 | 160 | 128 | 114.286 | 114.286 |
| | FDD | Number of OFDMA symbols per 5 ms frame | 43 | 31 | 39 | 43 | 43 |
| | | Idle time (μs) | 85.694 | 40 | 8 | 85.694 | 85.694 |
| | TDD | Number of OFDMA symbols per 5 ms frame | 42 | 30 | 38 | 42 | 42 |
| | | TTG + RTG (μs) | 199.98 | 200 | 136 | 199.98 | 199.98 |
| Number of Guard Sub-Carriers | Left | | 40 | 80 | 80 | 80 | 160 |
| | Right | | 39 | 79 | 79 | 79 | 159 |
| Number of Used Sub-Carriers | | | 433 | 865 | 865 | 865 | 1729 |
| Number of Physical Resource Unit (18 × 6) in a type-1 sub-frame. | | | 24 | 48 | 48 | 48 | 96 |

A subframe includes a plurality of physical resource units (PRUs) in frequency domain. The PRU is a basic unit for resource allocation and includes a plurality of OFDM symbol consecutive in time domain or a plurality of subcarriers continuous n frequency domain. For instance, the number of OFDM symbols within PRU can be equal to that of OFDM symbols included in a subframe. Hence, the number of OFDM symbols within PRU can be determined according to a type of a subframe. Meanwhile, the number of subcarriers within PRU can be set to 18. In this case, the PRU can be constructed with 6 OFDM symbols×18 subcarriers. The PRU can be called a distributed resource unit (DRU) or a continuous resource unit (CRU) according to a resource allocation scheme.

The above-mentioned structure is exemplarily shown only. Therefore, it is able to variously modify a superframe length, the number of frames included in a superframe, the number of subframes included in a frame, the number of OFDMA symbols included in a subframe, a parameter of OFDMA symbol and the like. For instance, the number of subframes included in a frame can be variously modified according to a channel bandwidth or a length of CP (cyclic prefix).

Figure 5:
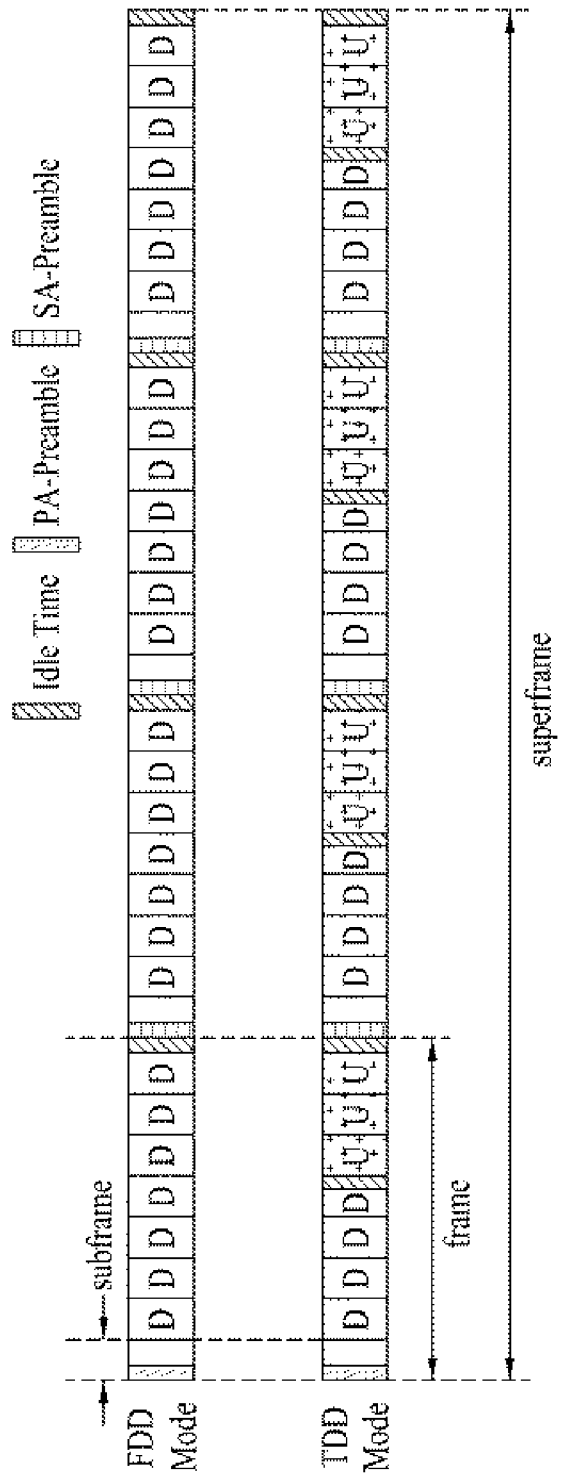
FIG. 5 is a diagram for a structure of a superframe according to a duplex mode in IEEE 802.16m system.

FIG. 5 is a diagram for a structure of a superframe according to a duplex mode in IEEE 802.16m system. The present embodiment assumes IEEE 802.16m-only mode.

Referring to FIG. 5, in FDD mode, as downlink transmission and uplink transmission are discriminated from each other according to a frequency, a frame includes either a downlink subframe D or an uplink subframe U. In case of the FDD mode, an idle time can exist at the end of each frame. On the contrary, in TDD mode, as downlink transmission and uplink transmission are discriminated from each other according to a time, subframes within a frame can be divided into downlink subframes D and uplink subframes U. While downlink is changed into uplink, an idle time called TTG (transmit/receive transition gap) exists. While uplink is changed into downlink, an idle time called RTG (receive/transmit transition gap) exists. In IEEE 802.16m system, a downlink synchronization channel includes a primary synchronization channel and a secondary synchronization channel. The primary synchronization channel includes a PA-preamble (primary advanced preamble). And, the secondary synchronization channel includes an SA-preamble (secondary advanced preamble). The PA-preamble is used in obtaining such information as a time/frequency synchronization and fractional cell identifier, system information and the like. The SA-preamble is used in obtaining a final physical cell identifier and can be used for RSSI (received signal strength indication) measurement and the like.

Figure 6:
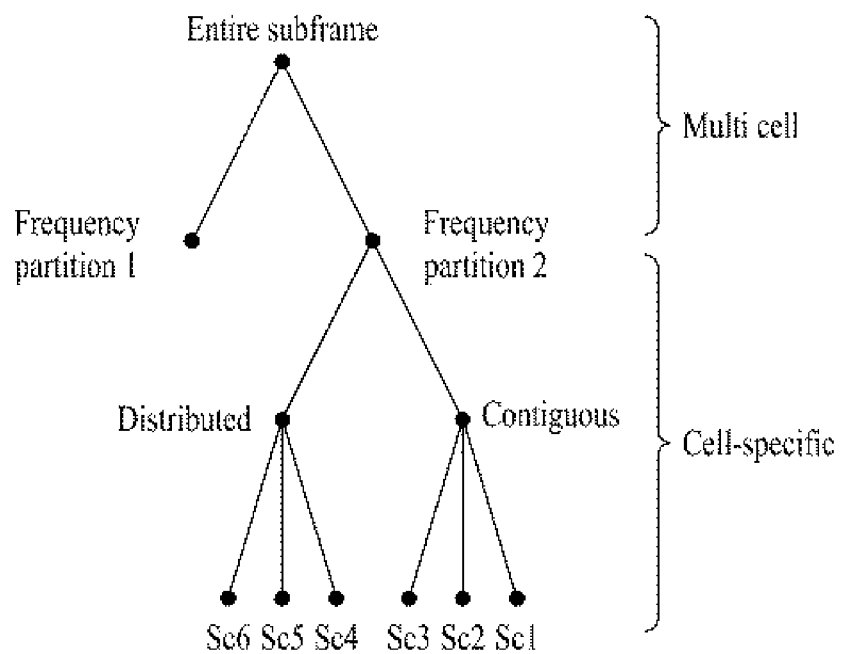
FIG. 6 is a diagram for an example of a physical structure of a subframe in IEEE 802.16m system.

FIG. 6 is a diagram for an example of a physical structure of a subframe in IEEE 802.16m system.

Referring to FIG. 6, a subframe can be partitioned into at least one frequency partition (FP). FIG. 6 shows an example that a subframe is partitioned into 2 frequency partitions, by which the number of frequency partitions is non-limited. The frequency partition is usable for the purpose of FFR (fractional frequency reuse) and the like.

Each frequency partition includes at least one PRU. Distributed resource allocation and/or contiguous resource allocation is applicable to each frequency partition. A logical resource unit (LRU) is a basic logical unit for the distributed resource allocation and the contiguous resource allocation. A logical distributed resource unit (LDRU) includes a plurality of subcarriers Sc distributed within a frequency band. A size of the LDRU is equal to that of the PRU. The LDRU is generally called a distributed LRU (DLRU). The LCRU (logical contiguous resource unit) includes contiguous subcarriers Sc. A size of the LCRU is equal to that of the PRU. And, the LCRU is generally called a contiguous LRU (CLRU).

Figure 7:
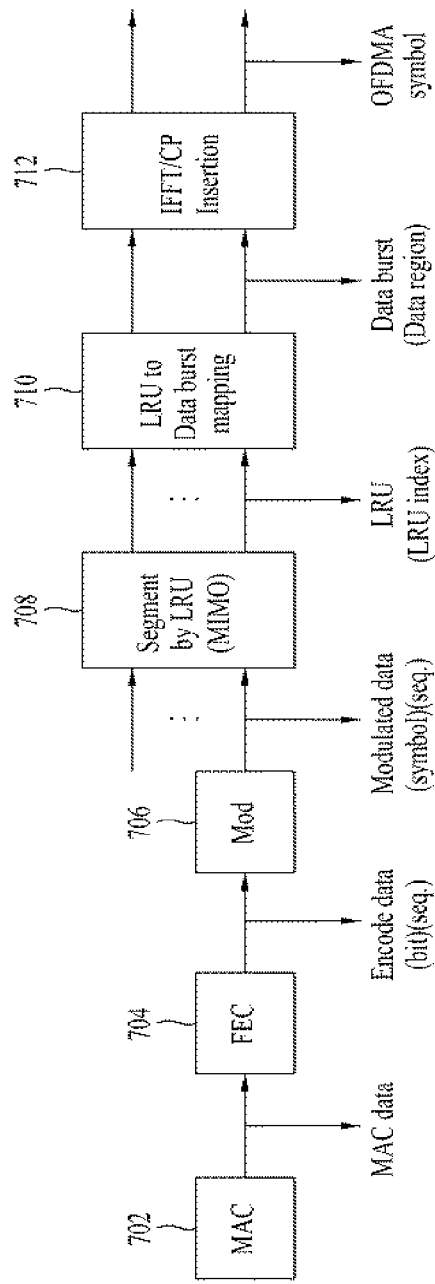
FIG. 7 is a block diagram for an example of a transmission chain in IEEE 802.16m system.

FIG. 7 is a block diagram for an example of a transmission chain in IEEE 802.16m system.

Referring to FIG. 7, a medium access control (MAC) block 702 constructs MAC data from upper layer data. A size of the MAC data is scheduled by TTI transmission time interval) unit. The MAC data is generally called a transport block and corresponds to a codeword in a following process. FFC (forward error correction) block 704 performs channel coding on the MAC data. The channel coding may be performed using TC (Turbo Coding), CTC (Convolutional Turbo Coding), LDPC (Low Density Parity Check) or the like, by which the present invention is non-limited. The coded data can be generally named a codeword or coded packet data. Mod(modulation) block 706 modulates the coded data. It is able to perform the data modulation using such a modulation scheme as n-PSK (Phase Shift Keying), n-QAM (Quadrature Amplitude Modulation) and the like [where, 'n' is an integer], by which the present invention is non-limited. LRU allocation block 708 divides a modulated symbol into LRU-size segments and then allocates each of the segments to the LRU. Mapping block 710 maps the LRU by a data burst. The data burst is allocated to the PRU in a physical frequency region. Therefore, the mapping block 710 performs a function of mapping the modulated data by a subcarrier according to the mapping relation between the LRU and the PRU. IFFT/CP block 710 transforms a frequency-domain signal into a time-domain signal by performing IFFT on the frequency-domain signal and then generates an OFDMA symbol by adding a cyclic prefix to the time-domain signal.

Figure 8:
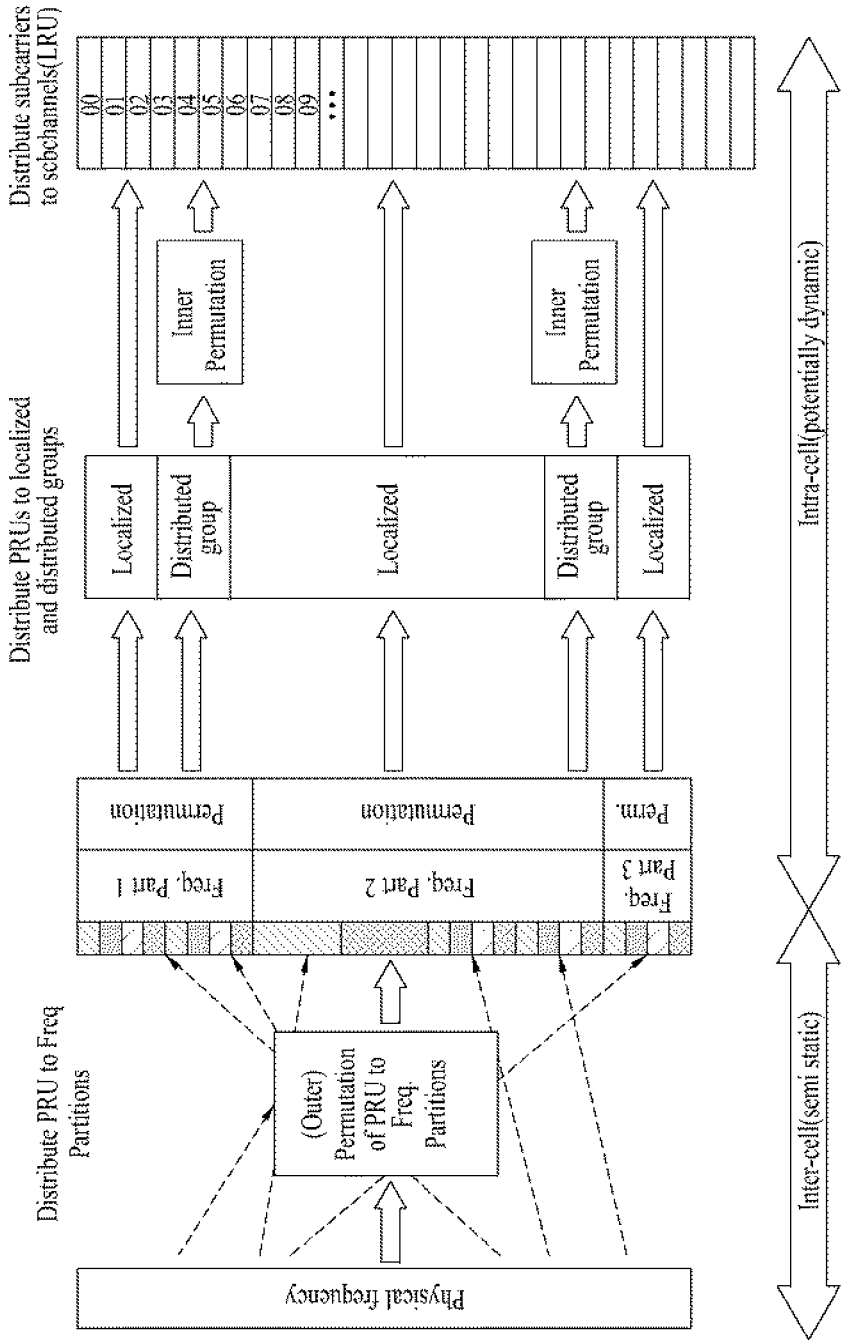
FIG. 8 is a diagram for an example of a process for mapping a resource unit.

FIG. 8 is a diagram for an example of a process for mapping a resource unit.

Referring to FIG. 8, it is able to perform outer permutation on a physical frequency resource. The outer permutation is applied by a unit of at least one PRU. The outer permutation can be performed by the unit of N1 or N2 PRUs (N1>N2). In this case, N1 or N2 is variable according to a bandwidth. Yet, for efficient outer permutation, N1 needs to be set to an integer multiple of N2. Like subband partitioning or miniband permutation, the outer permutation can mean a process including the steps of dividing PRUs into subband (SB) PRU (hereinafter abbreviated PRUSB) and miniband (MB) PRU (hereinafter abbreviated PRUMB) and performing permutation by PRU unit on the miniband PRU. The PRUSB is the PRU that will be allocated to subband. And, the PRUMB is the PRU that will be allocated to miniband. In the above-mentioned process, the N1 indicates the number of PRUs included in the subband and the N2 indicates the number of PRUs included in the miniband.

Subsequently, the rearranged PRUs are distributed to frequency partitions. Each of the frequency partitions is divided into LCRU (logical CRU) and LDRU (logical DRU). Sector-specific permutation is supportable. And, direct mapping of resource can be supported for a contiguous resource. A size of distributed/contiguous resource can be flexibly set per sector.

Subsequently, contiguous group and distributed groups are mapped by LRU. Inner permutation defined for the distributive resource allocation (or subcarrier permutation) enables subcarriers to be spread within entire distributed resources. There is no inner permutation for contiguous resource allocation. PRU is directly mapped by a contiguous resource unit within each frequency partition.

Meanwhile, a fractional frequency reuse (FFR) scheme is available. The FFR scheme is the scheme of dividing or partitioning an entire frequency band into a plurality of frequency partitions (FPs) and then allocating the frequency partitions to cells, respectively. Different frequency partitions can be allocated to adjacent cells by the FFR scheme. And, the same frequency partition can be allocated to cells located far distant from each other by the FFR scheme. Therefore, inter-cell interference can be reduced. And, performance of a mobile station located at a cell edge can be enhanced.

In case of partitioning an entire frequency band into a plurality of frequency partitions, this partitioning can be performed according to a case that a region having a frequency reuse factor, which is used in common between cells, set to 1 exists or a case that this region does not exist. The region having the frequency reuse factor set to 1 means a frequency region used in common by all cells.

If an entire frequency band is partitioned in to 4 frequency partitions, frequency reuse factors of the frequency partitions become 1, ⅓, ⅓ and ⅓, respectively. In this case, the frequency partition having the frequency reuse factor set to 1 becomes a frequency partition FP0 of a first index. And, the frequency partitions having the frequency reuse factors set to ⅓ become frequency partitions FP1, FP2 and FP3, respectively.

Meanwhile, if an entire frequency band is partitioned in to 3 frequency partitions, a frequency reuse factor of each of the frequency partitions becomes ⅓. And, the frequency partitions become FP1, FP2 and FP3, respectively. In particular, the entire frequency band is partitioned into 3 frequency partitions without a region having a frequency reuse factor set to 1.

Figure 9:
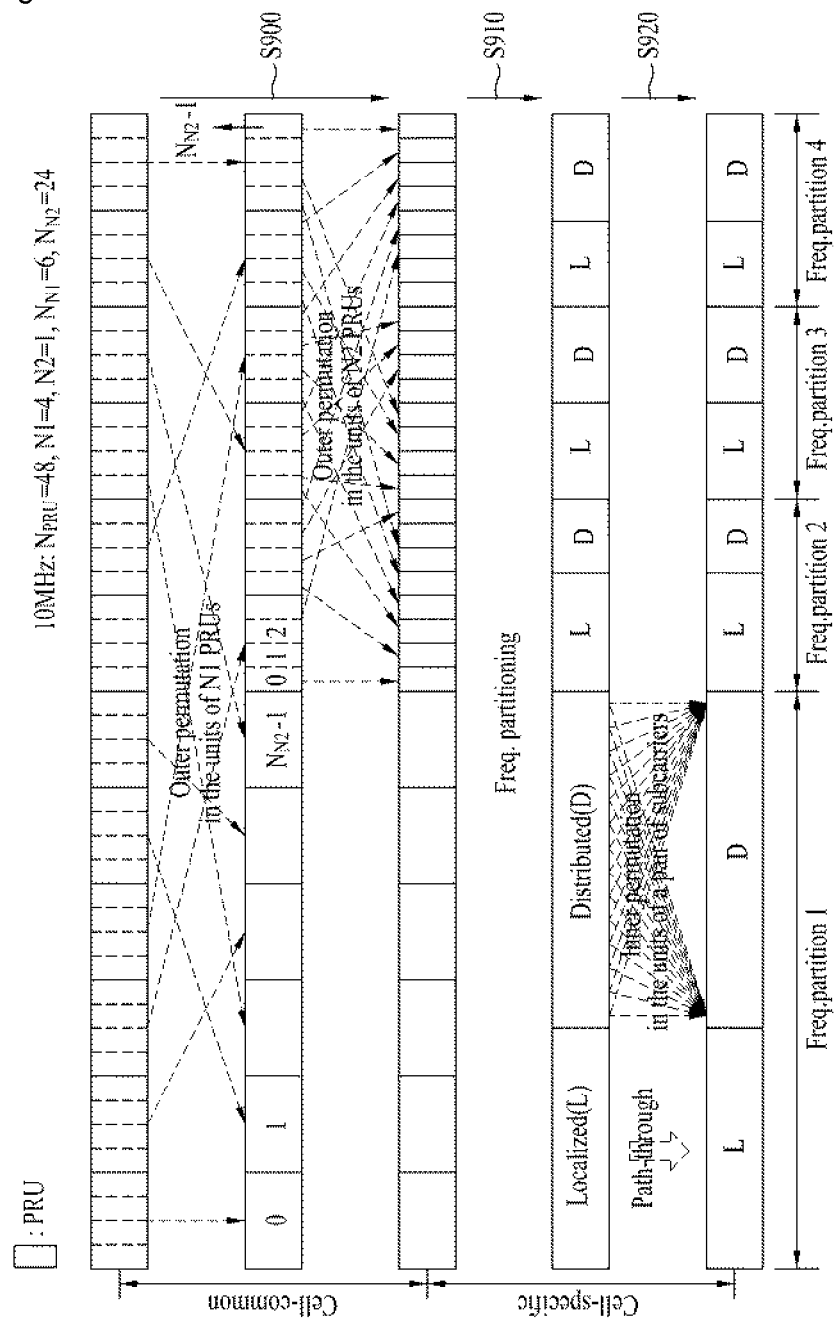
FIG. 9 is a diagram for an example of a subchannelization process.

FIG. 9 is a diagram for an example of a subchannelization process. There are factors that should be taken into consideration for subchannelization. For instance, those factors for the subchannelization include performance of DRU and CRU, signaling overhead for resource allocation, CQI (channel quality indicator) feedback overhead, ratio flexibility between distributed resource and contiguous resource, facilitation of scaling according to a bandwidth (BW), facilitation of resource allocation sequence design, facilitation of FFR setting and the like. For clarity, the following assumptions are taken for example. First of all, an entire frequency band is 10 MHz. The total number of PRUs is 48. N1 is se to 4. The number (NN1) of subbands having granularity of N1 is 6. N2 is se to 1. And, the number (NN2) of minibands having granularity of N2 is 24.

Referring to FIG. 9, PRU in a physical region is divided into subband PRU of logical region or miniband PRUs through outer permutation of granularity of N1. And, permutation is then performed on the miniband PRU with granularity of N2 [S900].

The subband or miniband PRU is distributed to each frequency partition. And, permutation for discriminating contiguous resource L and distributed resource D within the frequency partition is performed [S910]. The process for distributing the subband or miniband PRU to each frequency partition is performed by being included in or separated from the outer permutation process of S900. In case that this process is performed independently, it is performed based on frequency partition information broadcasted through SFH or based on a separate distribution rule. In order to obtain a diversity gain for the distributed resource, inner permutation is additionally performed [S920].

In consideration of an environment that E-MBS (enhanced-multicast broadcast service) data is transmitted by being multiplexed with unicast data, a resource allocating method for the E-MBS data may vary according to a multiplexing scheme. N association with the resource allocating method, a channel estimation scheme may vary as well. And, a pilot allocating method for the E-MBS channel estimation should be changed according to the channel estimation scheme as well. In this case, it is able to consider such a general multiplexing scheme as TDM (tune division multiplexing) and FDM (frequency division multiplexing). In addition, a hybrid type for supporting TDM and FDM simultaneously is operable as well.

In case of using the TDM scheme, E-MBS data is allocated to at least one subframe, which is a basic resource allocation unit, entirely. Therefore, it is able to obtain channel estimation information using a pilot signal in an entire frequency region. This is helpful to enhance channel estimation performance.

On the contrary, in case of multiplexing by FDM scheme, an E-MBS channel estimation unit may vary according to a permutation scheme. In particular, if distributed permutation is performed, E-MBS channel estimation has to be performed by one basic resource unit (e.g., 18 subcarriers 6 symbols). Yet, if localized permutation is performed, it is possible to estimate an E-MBS channel within several basic resource units adjacent to each other, e.g., a plurality of basic resource units such as 3 basic resource units, 4 basic resource units and 5 basic resource units. Generally, performance in case of channel estimation performed within one basic resource unit is poorer than that in case of channel estimation performed within a plurality of basic resource units adjacent to each other.

In the following description, a method of allocating a resource for broadcast data according to a multiplexing scheme is explained.

Resource allocating method for E-MBS data in case of FDM for multiplexing

Figure 10:
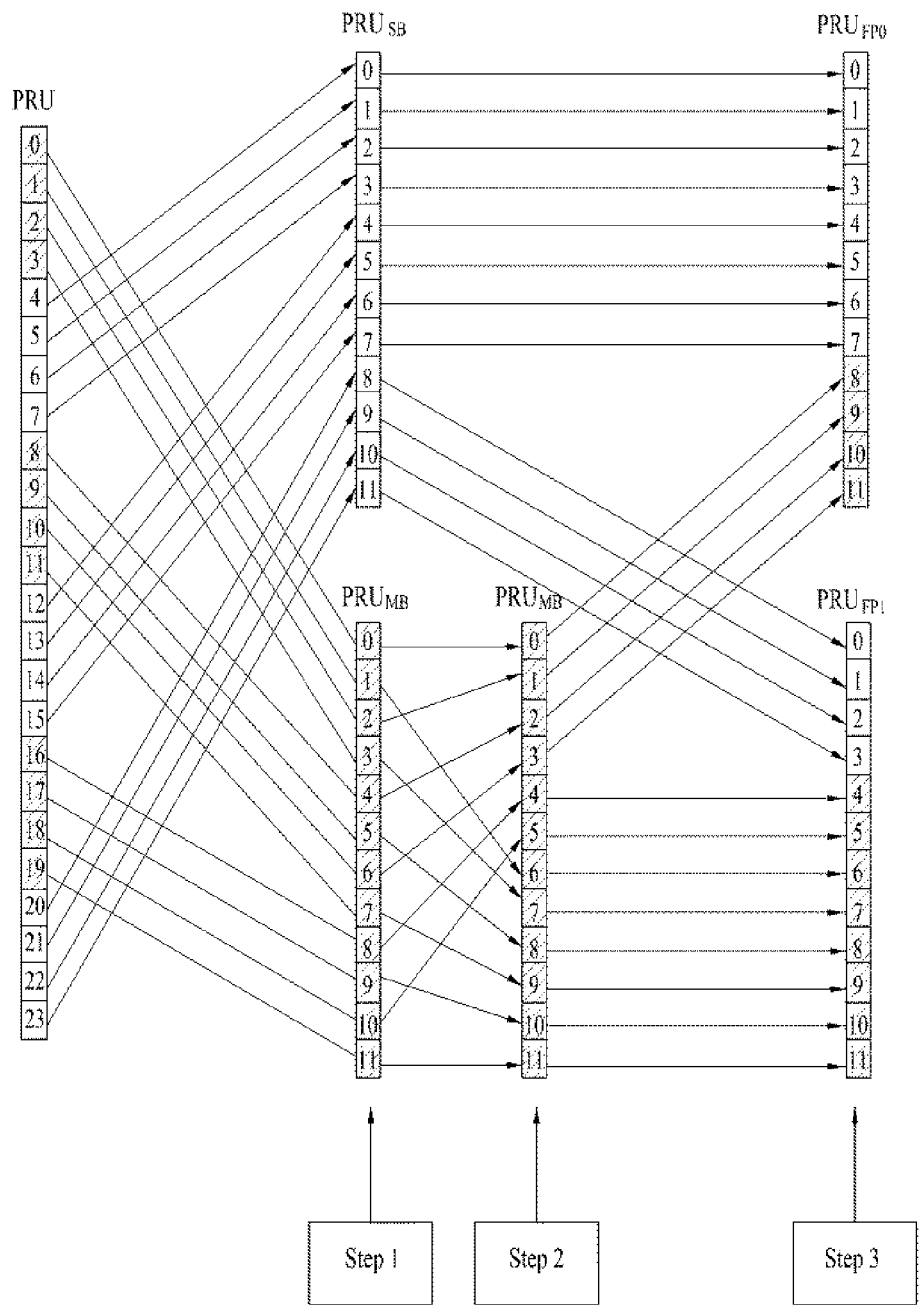
FIG. 10 is a diagram for a general frequency partitioning method.

FIG. 10 is a diagram for a general frequency partitioning method. For example, in FIG. 10, a system bandwidth (BW) is 5 MHz, SAC (Subband Allocation Count) is 3, FPCT (Frequency Partition Count) is 2, FPS (Frequency Partition Size) is 12, and FPSC (Frequency Partition Subband Count) is 1. Particularly, the SAC indicates the number of subbands included in entire frequency partitions, the FPCT indicates the number of frequency partitions, the FPS indicates the number of PRUs included in each frequency partition, and the FPSC indicates the number of subbands included in frequency partition except FP0. This frequency partition setting information is transmitted to a mobile station via a broadcast channel including FPC (frequency partition configuration) field.

Referring to FIG. 10, in the step 1, an entire frequency band is divided into subbands and minibands using SAC, FPCT and FPS. Subsequently, in the step 2, miniband permutation is performed on the miniband. Finally, in the step 3, a frequency partition FP0 and a frequency partition FP1 are set using FPSC.

Referring to the step 3 shown in FIG. 10, PRU allocated to each frequency partition is constructed with subband or miniband only or can be constructed with a combination of subband and miniband.

According to a first scheme of allocating a resource for E-MBS data, after the step 3 shown in FIG. 10 has been completed, at least one subband of a random frequency partition is allocated to the E-MBS data. Thus, the subband is allocated to the E-MBS data. As mentioned in the foregoing description, this is because channel estimation effect is increased if the allocation is performed on the contiguous resources in a frequency domain.

The random frequency partition is a pre-reserved frequency partition or can be signaled to a mobile station by a base station. Yet, as a result of the above described frequency partition dividing process, subbands of FP0 existing in common to all cells are preferably allocated to broadcast data. In the following description, assume that subbands of FP0 are preferentially allocated to broadcast data.

Figure 11:
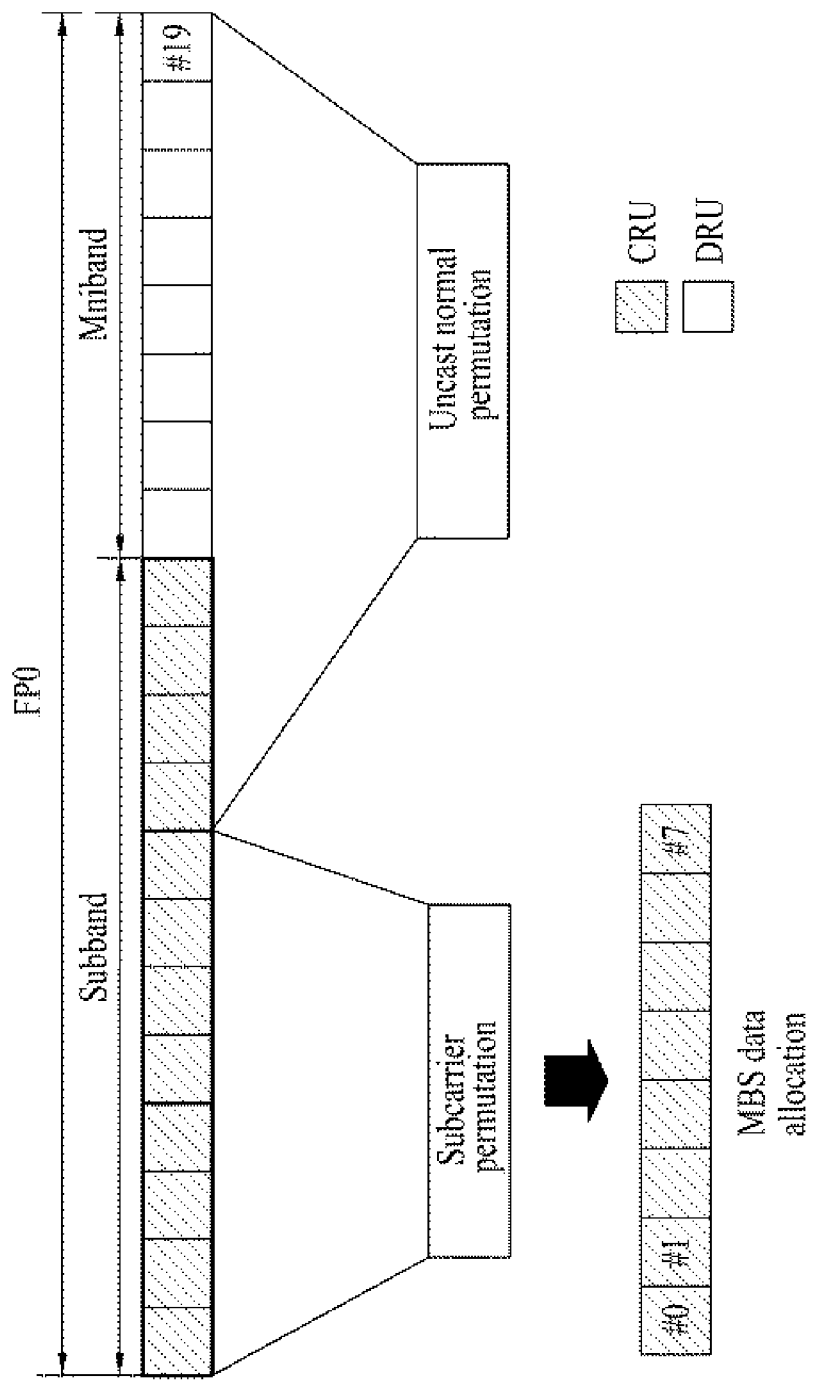
FIG. 11 is a diagram for an example of a method for allocating subbands of FP0 to E-MBS data according to an embodiment of the present invention.

FIG. 11 is a diagram for an example of a method for allocating subbands of FP0 to E-MBS data according to an embodiment of the present invention. Particularly, FIG. 11 exemplarily shows that two higher subbands of FP0 are allocated to E-MBS data and that the remaining region (subband and miniband) is allocated to unicast data. Alternatively, it is able to set a miniband region to be allocated to a control channel (ACK/NACK channel) of the unicast data or it is able to set the miniband region not to be used. Moreover, it is able to consider a scheme of transferring miniband included in the FP0 to another frequency partition.

Referring to FIG. 11, since subband is allocated to E-MBS data only, channel estimation can be performed by 4-PRU unit. Control information for supporting this resource allocating method includes information on a start position of subband allocated to the E-MBS data and information on the number of the subbands. If resource allocation is performed, it should be signaled to a mobile station essentially. Moreover, the control information is preferably transmitted to the mobile station via a superframe header or a broadcast channel.

Besides, in order to reduce signaling overhead, in case of allocating subbands of FP0 to E-MBS data, a subband of a lowest or highest index to be first allocated. Yet, in case that the allocation starts with the highest index, since a total number difference of subbands included in FP0 of each cell may exist, it is preferable that the allocation preferably starts with the lowest index. In this case, a base station is able to signal the number of subbands to a mobile station only.

Meanwhile, subcarrier permutation is not performed on CRU in general. Yet, according to the present invention, in order to obtain additional diversity gain, subcarrier permutation is preferably performed on subbands having E-MBS data allocated thereto as shown in FIG. 11. Since the subcarrier permutation uses a cell ID as a factor, all cells, which are transmitting broadcast data in case of performing subcarrier permutation on the E-MBS data allocated subbands, can be set to have a common ID (e.g., E-MBS zone ID) or a cell ID parameter can be set to 0 (turn-off).

In FIG. 11, a general permutation process is performed on a frequency region failing to be allocated to E-MBS data. In this case, permutation is not performed on a subband region.

In the above description, explained is a method of allocating subbands included in one frequency partition to E-MBS data. Yet, if the number of subbands required for transmitting the E-MBS data is greater than that of subbands included in one frequency partition, subbands included in a plurality of frequency partitions can be allocated as resources for the E-MBS data.

In particular, after subbands of FP0 have been completely used, it is able to set subbands of a next adjacent frequency partition to be used in addition. If a resource needs to be used additionally, a method of using a maximum same number of subbands for each frequency partition is available. Alternatively, a method of using subbands according to an index of a frequency partition is available as well. In the following description, a method of using a maximum same number of subbands for each frequency partition is explained in detail.

Figure 12:
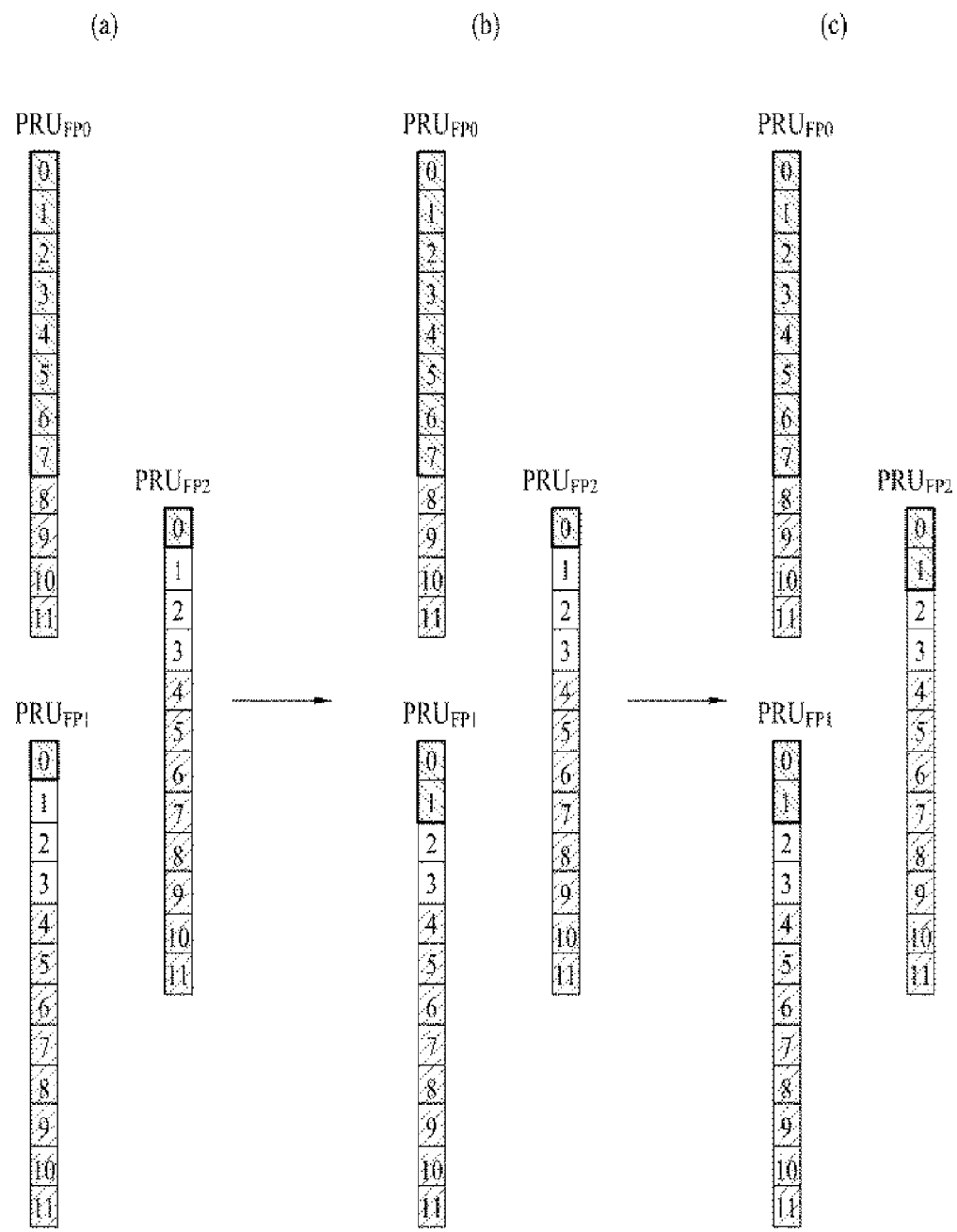
FIG. 12 is a diagram for a method for allocating subbands included in a plurality of frequency partitions as a resource for E-MBS data according to an embodiment of the present invention.

FIG. 12 is a diagram for a method for allocating subbands included in a plurality of frequency partitions as a resource for E-MBS data according to an embodiment of the present invention. In FIG. 12, a subband is represented not as PRU unit but as 4-PRU unit and a miniband is represented as 1-PRU unit.

Referring to FIG. 12 (a), if the number of subbands required for E-MBS data is set to $K_{SB,E-MBS}$ and the number of subbands included in FP0 is set to KSB, FP0, E-MBS data is allocated in a manner of starting with a subband of a lowest index included in the FP0. If $K_{SB,E-MBS} > K_{SB,FP0}$, i.e., the subbands included in the FP0 are not sufficient as resources for the E-MBS data, the remaining number ($K_{SB,E-MBS} - K_{SB,FP0}$) of resources are allocated one by one to each of the remaining FPs in a manner of starting with a subband having a lowest index. For instance, when FPCT is 3, if all subbands of FP0 are allocated for E-MBS data, the remaining resources for the E-MBS data are allocated to a lowest subband of FP1 and a lowest subband of FP2.

Subsequently, referring to FIG. 12 (b) and FIG. 12 (c), the resources are allocated to a next subband of the FP1 and a next subband of the FP2. This process keeps being performed until '$K_{SB,E-MBS} = K_{SB,FP0}$' is met to allocate the resources for the E-MBS data. The FP1 is described as preceding over FP2, which is just for clarity of description. And, it is apparent that the FP2 can be set to precede over the FP1.

As mentioned in the foregoing description, it is able to attempt to obtain a diversity gain by applying subcarrier permutation on a resource region allocated to E-MBS data. Meanwhile, the $K_{SB,E-MBS}$ can be signaled to a mobile station by being carried on E-MBS_SUBBAND_INDICATOR field included in AAI-E-MBS_CFG (Advanced Air Interface-E-MBS Configuration) message. Moreover, the AAI-E-MB- S_CFG can further include E-MBS_SUBFRAME_INDICATOR informing the mobile station what subframe carries the E-MBS data.

As a scheme of allocating a resource for E-MBS data, it is able to consider a scheme of allocating miniband CRU to E-MBS data instead of subband.

Figure 13:
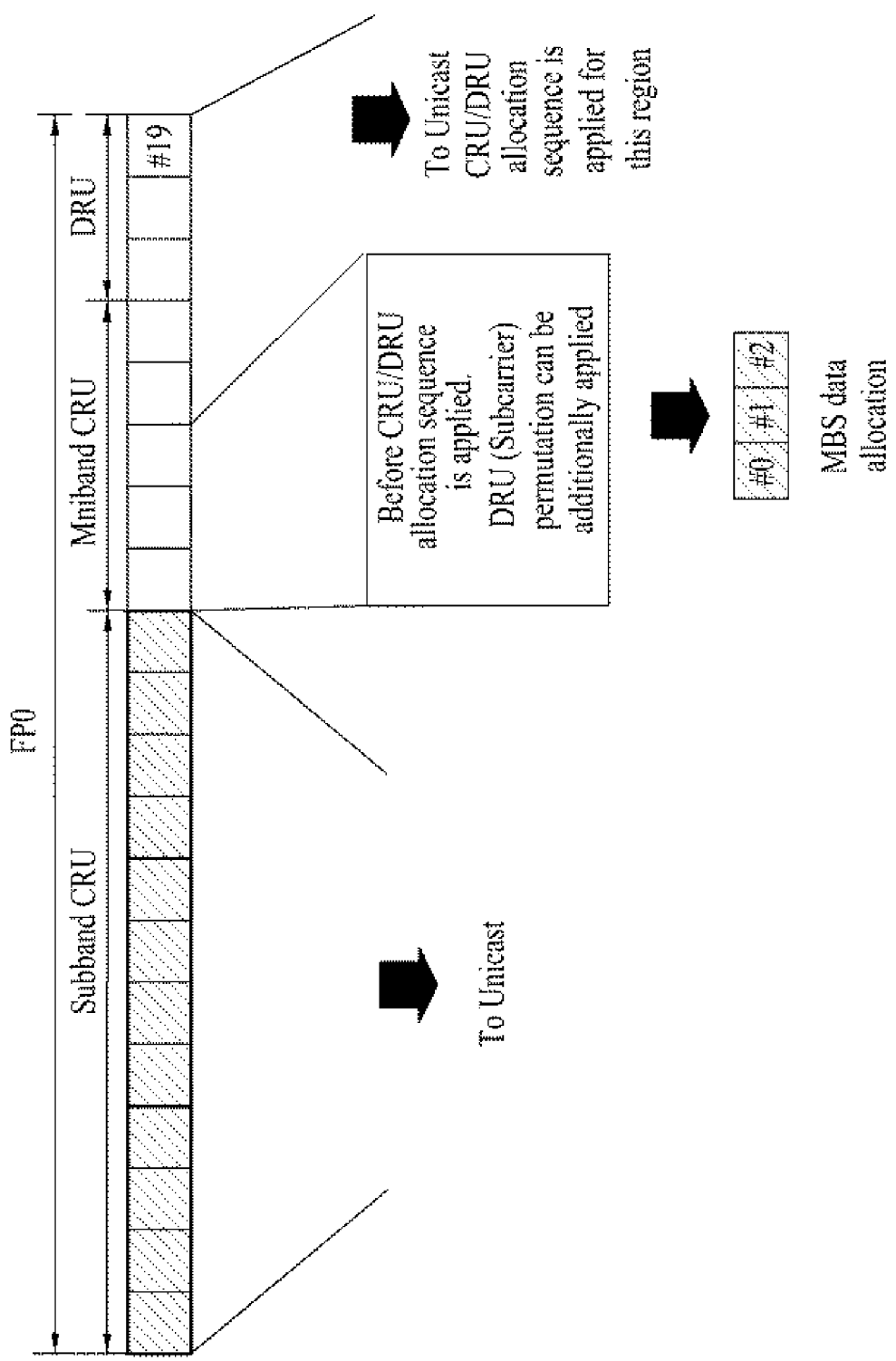
FIG. 13 is a diagram for an example of a method for allocating minibands of FP0 to E-MBS data according to an embodiment of the present invention.

FIG. 13 is a diagram for an example of a method for allocating minibands of FP0 to E-MBS data according to an embodiment of the present invention. Particularly, FIG. 13 shows that subband CRU and miniband DRU of FP0 are allocated to unicast data and that miniband CRU is allocated to E-MBS data.

Referring to FIG. 13, unlike the above description, allocation can be performed in a manner that miniband CRU of a lowest index starts to be allocated to E-MBS data. Alternatively, allocation can be performed in a manner that miniband CRU of a highest index starts to be allocated in reverse direction.

Meanwhile, unlike the case of unicast data, it is able to apply subcarrier permutation of the related art to a resource region allocated to E-MBS data. By applying miniband permutation before subcarrier permutation additionally, it is able to further secure a diversity gain. In case of allocating miniband CRU to E-MBS data, information indicating the number of miniband CRUs existing in every frequency partition is preferably signaled. Accordingly, it is able to solve the resource shortage problem that may be caused in allocating a miniband region of FP0 to E-MBS data only.

Figure 14:
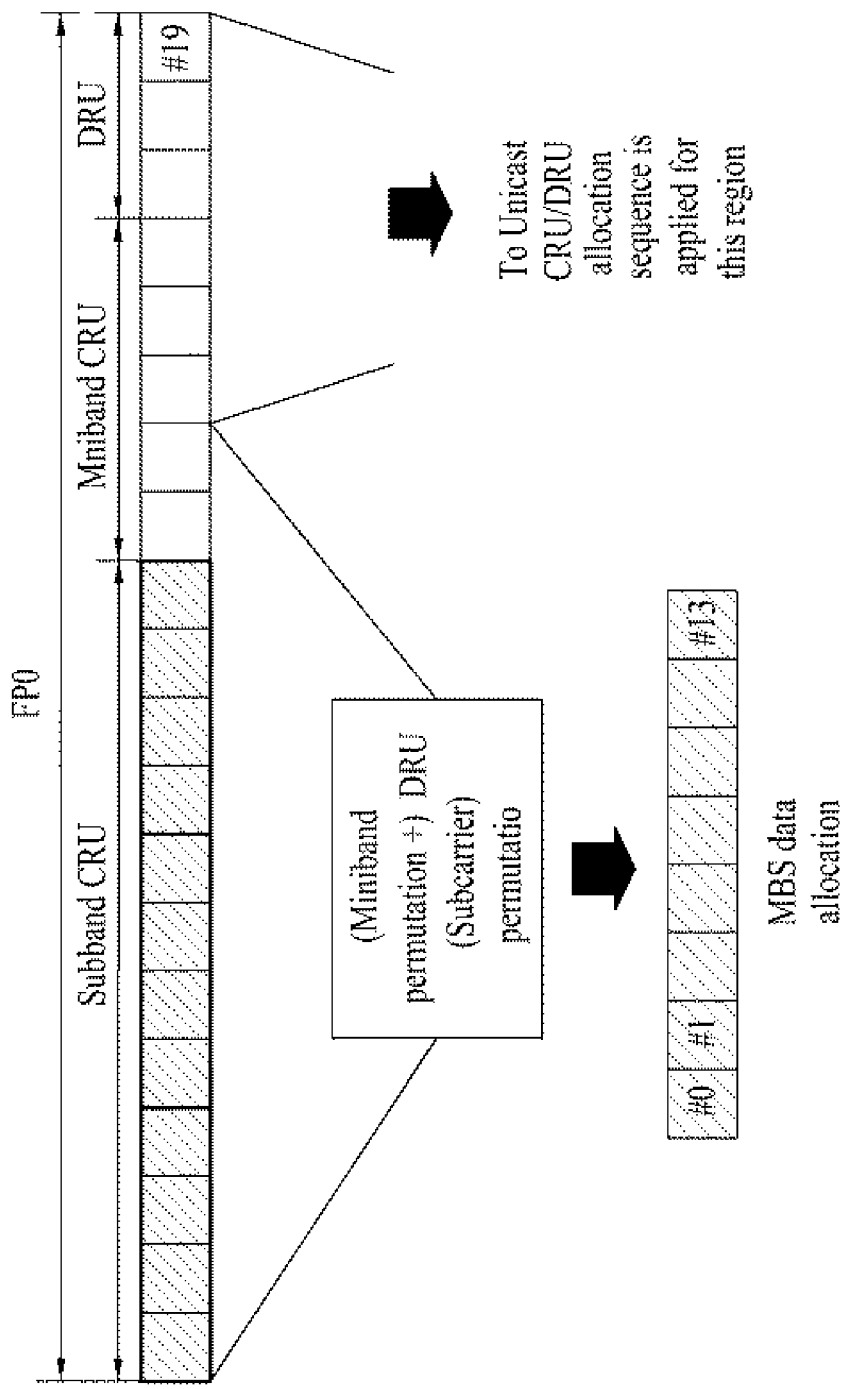
FIG. 14 is a diagram for an example of a method for allocating frequency resources across subband and miniband of FP0 to E-MBS data according to an embodiment of the present invention.

As a third scheme of allocating a resource for E-MBS data, it is able to allocate a resource for E-MBS data, as shown in FIG. 14, without limiting a frequency region allocated to E-MBS data to either subband CRU or miniband CRU.

FIG. 14 is a diagram for an example of a method for allocating frequency resources across subband and miniband CRU of FP0 to E-MBS data according to an embodiment of the present invention. In this case, it is able to allocate resources for E-MBS data in a manner of starting with LRU or CRU of a lowest index included in a specific frequency partition. For this, it is able to signal the number of LRU (or CRU) allocated to the E-MBS data.

As a fourth scheme of allocating a resource for E-MBS data, it is able to sub-channelize an entire frequency band or a random frequency partition, which is allocated to E-MBS data into DRU. And, a predetermined number of LRUs can be allocated for E-MBS data from the LRU of a lowest or highest index.

Meanwhile, in order to support MBSFN (Multimedia Broadcast Multicast Service Single Frequency Network), it is able to omit the CRU/DRU discriminating process in a subframe for transmitting E-MBS data.

Resource allocating method for E-MBS data in case of TDM

In the following description, explained is a case that E-MBS data and unicast data are multiplexed together by TDM.

In the step 1 (i.e., outer permutation step) shown in FIG. 10, all PRU can be rendered into PRUSB or PRUMB. In this case, the PRUSB or PRUMB of a specific frame for E-MBS can become 0. Moreover, after completion of the step 1, it is possible to perform inner permutation on entire resources by DRU scheme again.

If at least one frequency partition exists and multiplexing is performed by TDM, a resource of a frequency partition having a frequency reuse factor set to 1 is allocated to E-MBS data. In this case, it is preferable that all frequency partitions use a CP of the same length. If cyclic prefixes differing from each other in length are used, E-MBS data should be transmitted through entire frequency partitions.

In this case, if E-MBS data and unicast data are multiplexed together by TDM, a method of allocating ACK/NACK channel (region) for unicast control information, and more particularly, for uplink data in a subframe for transmitting E-MBS data may cause a problem. In the following description, a method of allocating ACK/NACK channel for unicast data in a subframe for transmitting E-MBS data is proposed.

In a method of allocating ACK/NACK channel according to the present invention, a prescribed number of contiguous LRUs are allocated as resources for ACK/NACK channel in order of increasing indexes from the LRU of a lowest index or in order of decreasing indexes from the LRU of a highest index. In particular, although E-MBS data and unicast data are multiplexed together by TDM, the E-MBS data and ACK/NACK channel are multiplexed by FDM. This can be regarded as a hybrid type.

When E-MBS subframe is applied by Non-MBSFN (multicast broadcast single frequency network). Subcarrier permutation is performed in a manner that a subframe for carrying E-MBS data uses a function having a factor set to a cell ID. Hence, a diversity gain of ACK/NACK channel can be sufficiently secured.

On the contrary, when E-MBS subframe is applied by MBSFN, subcarrier permutation is performed in a manner that all cells enable a subframe for carrying E-MBS data to have a common ID (e.g., E-MBS zone ID) or that a cell ID parameter is set to 0 (turn-off). Hence, an error may be generated if ACK/NACK channel specified to one cell is received by another cell. Preferably, a problem of inter-cell interference is solved in a manner that CDM (code division multiplexing) is applied to a resource region to which ACK/NACK channel is allocated.

Moreover, it is able to set subcarrier permutation to be performed in a manner of allocating a predetermined resource region to ACK/NACK channel and using an individual cell ID instead of a common cell ID unlike E-MBS data. In this case, the predetermined region can be implemented in a manner of setting a resource region for ACK/NACK channel of unicast data to x PRUs uniformly distributed on an entire frequency band or a specific frequency partition and setting a resource region for E-MBS data to the remaining PRUs. In this case, the PRU allocated to the ACK/NACK channel is applicable in common to cells.

Regarding the x PRUs, a start PRU index can be set to an index of 0th PRU of a corresponding subframe or a specific frequency partition. Alternatively, a last PRU index is set to an index a last PRU of a corresponding subframe or a specific frequency partition. A value of the x is preferably set to one of 2 to 4 in consideration of diversity gain and frequency efficiency.

In order to secure similarity of subchannelization with a non-MBSFN subframe, subchannelization of MBSFN subframe is executable as follows. First of all, subband partitioning and miniband permutation in MBSFN subframe can be performed in the same manner of those in Non-MBSFN subframe. In particular, the subband partitioning and miniband permutation are performed by identically applying KSB signaled through DSAC (Downlink Subband Allocation Count). Alternatively, it is able to perform the miniband permutation on an entire frequency band by omitting the subband partitioning process.

Figure 15:
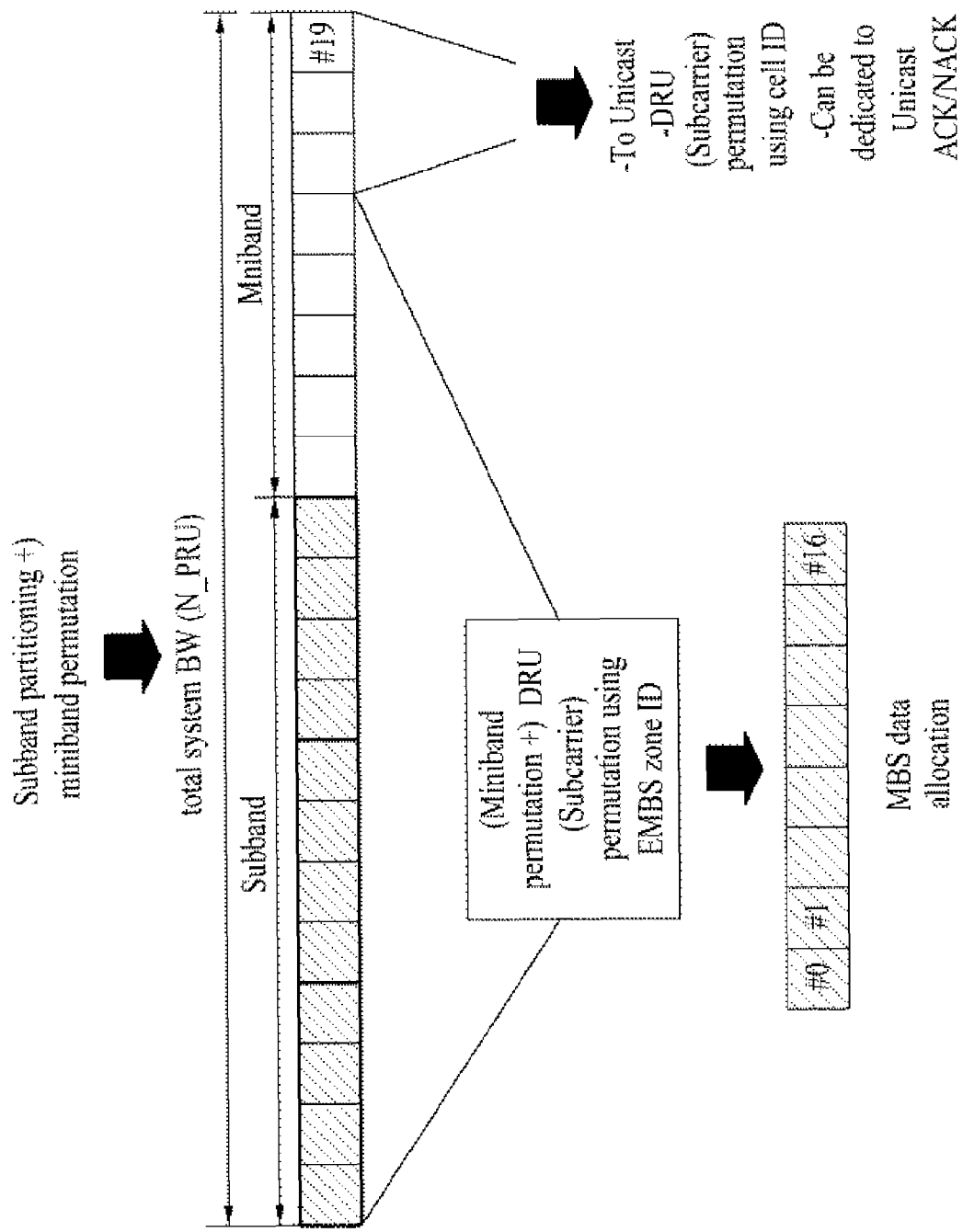
FIG. 15 is a diagram for a method of allocating a resource region for ACK/NACK channel to a subframe carrying E-MBS data according to an embodiment of the present invention.

FIG. 15 is a diagram for a method of allocating a resource region for ACK/NACK channel to a subframe carrying E-MBS data according to an embodiment of the present invention. Particularly, assume that a total number of PRUs is N_PRU and that x PRUs are allocated to a resource region for E-MBS data. In this case, 'x' can be signaled as the number of PRUs, minibands or subbands.

Referring to FIG. 15, x PRUs are allocated for E-MBS data in order of increasing indexes from 1st subband index of an entire frequency band. The N_PRU-x remaining PRUs are allocated for ACK/NACK channel of unicast data. Miniband permutation and subcarrier permutation are performed on the x PRUs to use for E-MBS. In doing so, the subcarrier permutation is preferably performed on the x PRUs using E-MBS zone ID.

The subcarrier permutation can be performed on the N_PRU-x remaining PRUs. In doing so, the subcarrier permutation is preferably performed on the N_PRU-x PRUs using individual cell IDs. The 'x' or 'N_PRU-x' can be set to a value in common to cells, a value fixed to a preset value or a signaled value.

And, the resource region for the ACK/NACK channel of the unicast data can be located ahead of the resource region for the E-MBS data on the frequency band. The above described subchannelization process can be set to be performed not on an entire frequency band but on a specific frequency partition.

Information on the resource region for the ACK/NACK channel of the unicast data is signaled via a superframe header, non-user specific A-MAP, extended non-user specific A-MAP or assignment A-MAP and preferably constructs a field with x-bit bitmap. Meanwhile, it is able to signal a value of 'x' that is the number of PRUs used for the preset region only. And, it is also able to signal inter-PRU interval informations of PRUs used for the preset region together.

Figure 16:
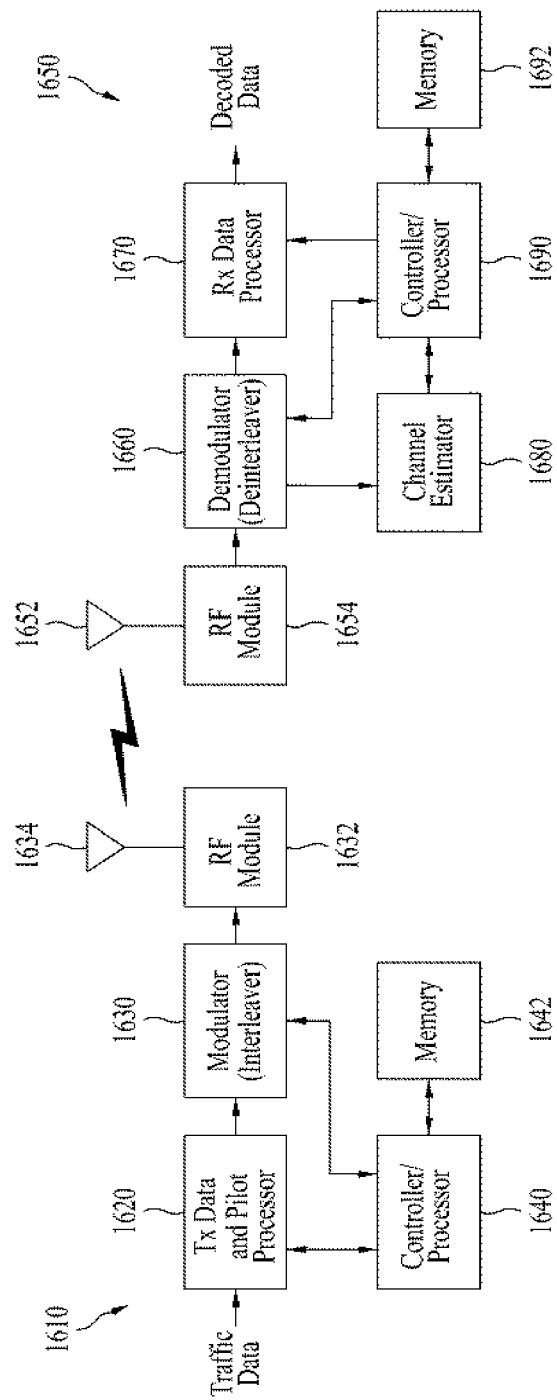
FIG. 16 is a block diagram for an example of a transmitter and receiver according to one embodiment of the present invention.

FIG. 16 is a block diagram for an example of a transmitter and receiver according to one embodiment of the present invention. In downlink, a transmitter 1610 is a part of a base station and a receiver 1650 is a part of a mobile station. In uplink, a transmitter 1610 is a part of a mobile station and a receiver 1650 is a part of a base station.

Referring to FIG. 16, in a transmitter 1610, a Tx data and pilot processor 1620 generates data symbols by performing encoding, interleaving and symbol mapping on data e.g., traffic data and signaling). And, the pilot processor 1620 generates pilot symbols and then multiplexes data and pilot symbols with each other.

A modulator 1630 generates transmission symbols according to a wireless access scheme. The wireless access scheme includes one of FDMA, TDMA, CDMA, SC-FDMA, MC-FDMA, OFDMA and combinations thereof. And, the modulator 1630 enables data to be transmitted by being distributed in a frequency region using one of various permutation schemes proposed by embodiments of the present invention.

A radio frequency (RF) module 1632 generates an RF signal from a transmission symbol through an antenna 1634 by performing signal processing (e.g., analog conversion, amplification, filtering and frequency uplink transform).

The receiver 1650 receives a signal transmitted by the transmitter 1610 and then forwards it to an RF module 1654. The RF module 1654 provides input samples by performing signal processing (e.g., filtering, amplification, frequency downlink transform, digitalization, etc.) on the received signal.

A demodulator 1660 provides a data value and a pilot value by demodulating the input samples. And, the demodulator 1660 performs data detection (or equalization) on the received data values using a channel estimation value and then provides data symbol estimation values for the transmitter 1610. Moreover, the demodulator 1660 is able to rearrange the data distributed in frequency and time domains into data arranged in original order by performing operations reverse to the corresponding one of the various permutation schemes proposed by the embodiments of the present invention.

An Rx data processor 1670 performs symbol demapping, deinterleaving and decoding on the data symbol estimation values and then provides decoded data.

Generally, the processings by the demodulator 1660 and the Rx data processor 1670 in the receiver 1650 are mutually supplemented with the processings of the modulator 1630 and the Tx data and pilot processor 1620 in the transmitter, respectively.

A controller/processor 1640/1690 monitors and controls operations of the modules existing in the transmitter/receiver 1610/1650. And, program codes and data for the transmitter/receiver 1610/1650 are stored in a memory 1642/1692.

The modules exemplarily shown in FIG. 16 are provided for the description only. The transmitter and/or the receiver can further include necessary module(s). The modules/functions are omitted in part or can be separated into different modules. And, at least two modules can be unified into one module.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The embodiments of the present invention have been described based on the data transmission and reception between the base station and the terminal. A specific operation which has been described as being performed by the base station may be performed by an upper node of the base station as the case may be. In other words, it will be apparent that various operations performed for communication with the user equipment in the network which includes a plurality of network nodes along with the base station can be performed by the base station or network nodes other than the base station. The base station may be replaced with terms such as a fixed station, Node B, eNode B (eNB), and access point. Also, the terminal may be replaced with terms such as user equipment (UE), mobile station (MS) and mobile subscriber station (MSS).

The embodiments according to the present invention can be implemented by various means, for example, hardware, firmware, software, or their combination. If the embodiment according to the present invention is implemented by hardware, the embodiment of the present invention can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the embodiment of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

Accordingly, the present invention is applicable to a wireless communication system, and more particularly, to a method for allocating a resource for multicast and/or broadcast service data in a wireless communication system and apparatus therefore.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

The invention claimed is:

1. A method for assigning subbands for multicast and/or broadcast service (MBS) data at a base station in a wireless communication system, the method comprising:
    partitioning a frequency band into a frequency partition 0 (FP0), a frequency partition 1 (FP1), and a frequency partition 2 (FP2); and
    assigning a maximum same number of subbands for the MBS data to the FP1 and FP2 after subbands of the FP0 have been completely used.

2. The method of claim 1, wherein the FP0 has a lowest index.

3. The method of claim 1, wherein the subbands for the MBS data are assigned from a subband having a lower index in each of the FP1 and the FP2, in order of increasing indexes of the subbands.

4. The method of claim 3, wherein the subbands for the MBS data are assigned from a frequency partition having a lower index among the FP1 and the FP2, in order of increasing indexes of the FP1 and the FP2.

5. The method of claim 1, further comprising performing subcarrier permutation to the assigned subbands for the MBS data.

6. A base station in a wireless communication system, comprising:
    a processor for partitioning a frequency band into a frequency partition 0 (FP0), a frequency partition 1 (FP 1), and a frequency partition 2 (FP2) and for assigning a maximum same number of subbands for multicast and/or broadcast service (MBS) data to the FP1 and the FP2 after subbands of the FPO have been completely used; and
    a transmitting module for transmitting the MBS data through the assigned subbands.

7. A method for receiving multicast and/or broadcast service (MBS) data at a mobile station through subbands for the MBS data in a wireless communication system, the method comprising:
    partitioning a frequency band into a frequency partition 0 (FP0), a frequency partition 1 (FP1) and frequency partition 2 (FP2); and
    receiving the MBS data through the subbands for the MBS data through the frequency band,
    wherein a maximum same number of subbands for the MBS data are assigned to the FP1 and the FP2 after subbands of the FP0 have been completely used.

8. The method of claim 7, wherein the FP0 has a lowest index.

9. The method of claim 7, wherein the MBS data is read from a subband having a lower index in each of the FP1 and the FP2, in order of increasing indexes of the subbands.

10. The method of claim 9, wherein the MBS data is read from a frequency partition having a lower index among the FP1 and the FP2, in order of increasing indexes of the FP1 and the FP2.

11. A mobile station in a wireless communication system, comprising:
    a processor for partitioning a frequency band into a frequency partition 0 (FP0), a frequency partition 1 (FP1), and a frequency partition 2 (FP2); and
    a receiving module for receiving multicast and/or broadcast service (MBS) data through subbands for the MBS data through the frequency band,
    wherein a maximum same number of subbands for the MBS data are assigned to the FP1 and the FP2 after subbands of the FP0 have been completely used.

* * * * *